United States Patent [19]

Temple, Jr. et al.

[11] Patent Number: 5,093,992
[45] Date of Patent: Mar. 10, 1992

[54] OPTICAL FIBER ACCESS TOOL

[76] Inventors: Kenneth D. Temple, Jr., 1260 5th St., NE. #70, Hickory, N.C. 28601; Andrew J. O'Neill, Rte. 9, Box 71, Hickory, N.C. 28603

[21] Appl. No.: 716,681

[22] Filed: Jun. 17, 1991

[51] Int. Cl.$^5$ ............................................. B26B 27/00
[52] U.S. Cl. ........................................ 30/90.8; 30/90.4
[58] Field of Search .................. 30/90.1, 90.4, 90.8, 30/DIG. 3; 81/9.4

[56] References Cited

U.S. PATENT DOCUMENTS 2,120,398  6/1938  Edwards et al. .............. 81/9.42
2,819,320  1/1958  Eyles .................................. 81/9.4 X
4,463,494  8/1984  Bianco ............................. 30/90.4
4,741,104  5/1988  Noon ................................ 30/90.4
4,947,549  8/1990  Genovese et al. ............. 30/90.8

OTHER PUBLICATIONS

Siecor Recommended Procedure SRP-004-014 (Nov. 1989).

Primary Examiner—Douglas D. Watts

[57] ABSTRACT

Disclosed is a tube slitting tool having at least one blade extending into a passage and the side of the passage opposing the blade is curved such that it curves away from the blade on either side in the longitudinal direction. The side of the passage holding the blade may also be curved.

4 Claims, 1 Drawing Sheet

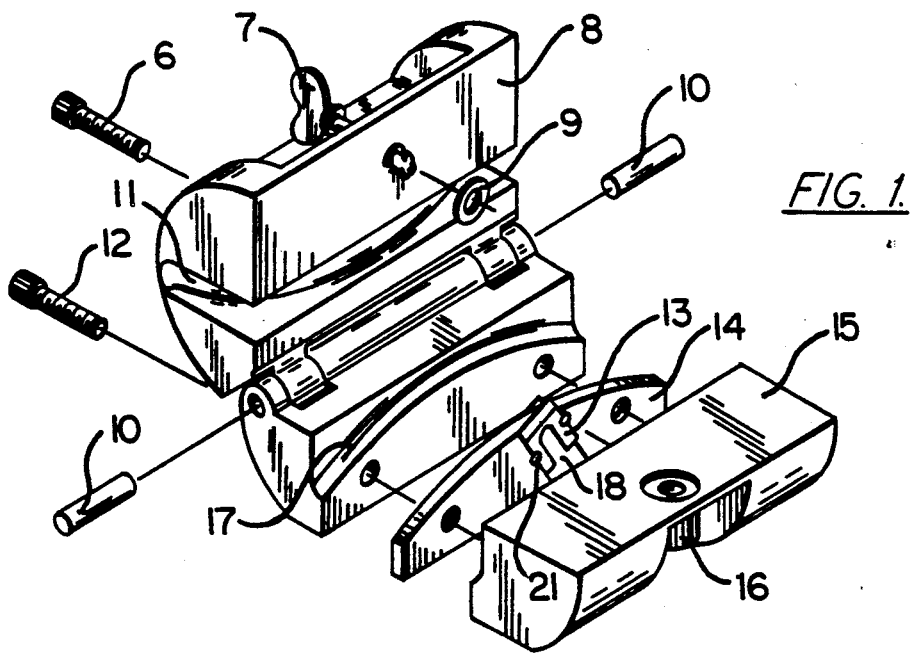
FIG. 1.
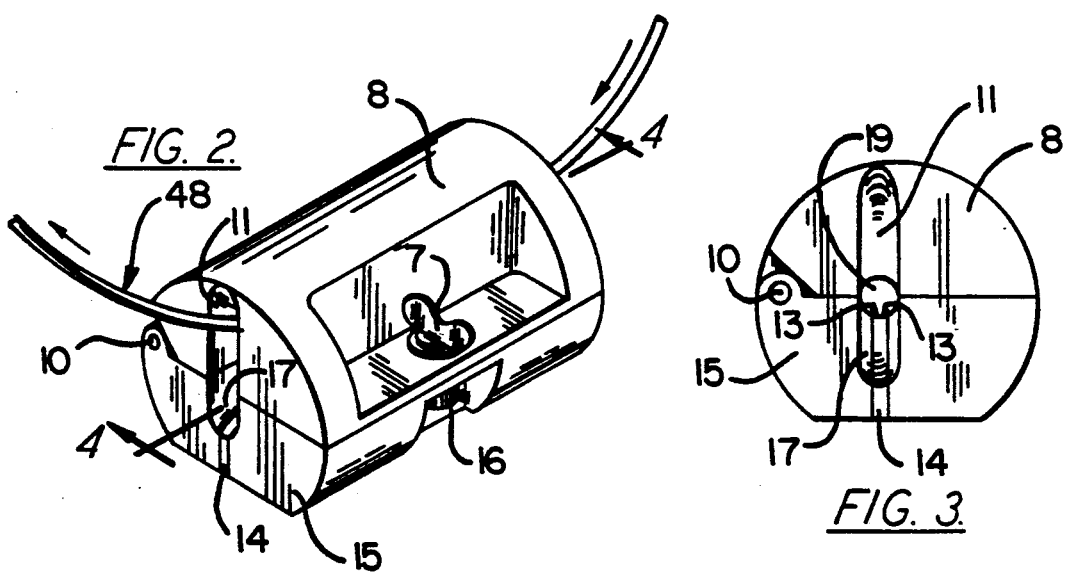
FIG. 2.
FIG. 3.
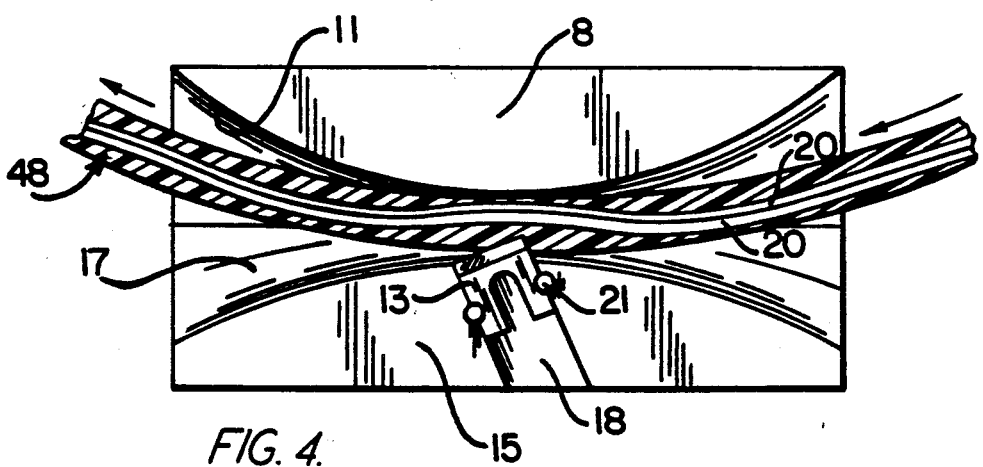
FIG. 4.

OPTICAL FIBER ACCESS TOOL

BACKGROUND OF THE INVENTION

Stripping tools used for stripping tubes holding copper communications media have been known for many years. More recently, tube slitters have been developed for optical fiber cables. For instance, Genovese, et al, U.S. Pat. No. 4,947,549, disclose such a tool having blades mounted on opposing sides of a passage.

SUMMARY OF THE INVENTION

It has been observed in the cabling of optical fibers that when loosely tubed light waveguides proceed around a sheave, light waveguides tend to migrate towards the inside of the curve. This observation has led to various methods for obtaining excess fiber length. The present invention incorporates this feature in a novel manner into the tube slitting tool art. Therefore, the tube slitting tool according to the invention provides at least two elongated members having grooves therein and forming, when the elongated members are closed, a bore having a longitudinal axis for confining a tube therein. This bore is partly delimited by a first groove, the first groove in a plane containing the longitudinal axis of the bore; the first groove has an apex within the bore and the distance of the first groove from the longitudinal axis steadily increases proceeding away from the first groove apex in either direction in the bore along the longitudinal axis. A first blade, and optionally, a second blade mounted parallel to the first blade on an elongated member extends radially into the bore confronting the first groove apex when the elongated members are closed. By this construction, the tube slitting tool may be drawn along a tube for mid span access of a loose tube optical waveguide cable with the tube following the first groove in the bore. Since the optical waveguides within the tube will tend towards the first groove, the waveguides will tend to migrate away from the blade or blades.

In order to ease use of the tool and reduce friction as much as possible, the first or the first and second blades may be mounted extending from a second groove in an elongated member groove whose apex confronts the first groove apex and the second groove distance from the longitudinal axis steadily increases proceeding away from the second groove apex in either direction along the longitudinal axis. Thus, the entire bore flares outwardly from the position of the blade or blades.

BRIEF DESCRIPTION OF THE DRAWINGS

The description of the preferred embodiment will be set out with reference to the drawing figures described below.

FIG. 1 is a perspective view of the tool in an opened position, with components separated slightly for clarity;

FIG. 2 is a perspective view of the tube in its closed position;

FIG. 3 is a side elevation view of the tool in its closed position; and,

FIG. 4 is a sectional view along lines 4—4 of FIG. 2.

DETAILED DESCRIPTION OF THE PREFERRED EMBODIMENT

The tool first elongated member (base) 8 is hinged and mounted to second elongated member 15 by dowel pins 10. Second elongated member 15 includes blade holder member 14 having slots 18 therein. Blades 13 are seated in blade slots 18 by the use of blade dowel pins 21. For machine production, it is preferable to seat blade dowel pins 21 in elongated member 17 so that a thicker metal is available for this purpose. Screws 6, 12 hold the components of second elongated member 15 together during use. First elongated member 8 and second elongated member 15 may then be closed, forming bore 19. Wing fastener 7, having washer 9, may be inserted through latch 16 to hold the tool closed during use. When the tool is closed, bore 19 is partially delimited by first groove 11 and second groove 17. When the tool is closed, blades 13 extend from second groove 17, blades 13 being parallel to each other and confronting the apex of first groove 11. Viewing the longitudinal section in FIG. 4, it is seen that blades 13 extend from the apex of second groove 17 to face the apex of first groove 11. All tool components should be formed from a rigid, durable metal.

Since the tool according to the invention is contemplated for use as a mid-span access tool, the arrows in FIGS. 2, 4 indicate the motion of the tool as it is pulled along buffer tube 48. The outer jacket and strength members of a cable should be removed over a length of buffer tube which is to be slit. As the tool is moved in the direction of said arrows, light waveguides 20 tend to approach the tube wall adjacent to first groove 11. This tendency is an important factor in keeping light waveguides 20 away from blades 13 as blades 13 slit the outer jacket of tube 48.

After the tube is slit, a ring (transverse) cut may be made in the tube in order to remove the slit section of tube.

We claim:

1. A tube slitting tool, comprising at least two elongated members having grooves therein forming, when the elongated members are closed, a bore having a longitudinal axis for confining a tube therein, the grooves so formed that the bore is partly delimited by a first groove in a plane containing the longitudinal axis said first groove having an apex is within the bore and whose distance from the longitudinal axis steadily increases proceeding away from the first groove apex in either direction along the longitudinal axis; and a first blade mounted on an elongated member extending radially into the bore confronting the first groove apex when the elongated members are closed.

2. A tube slitting tool as claimed in claim 1 further comprising a second blade mounted parallel to the first blade on an elongated member, the second blade confronting the first groove apex and extending radially into the bore when the elongated members are closed.

3. A tube slitting tool as claimed in claim 1, wherein the first blade is mounted extending from a second groove in an elongated member said second groove having an apex which, when the elongated members are closed, confronts the first groove apex and whose distance from the longitudinal axis steadily increases proceeding away from the second groove apex in either direction along the longitudinal axis.

4. A tube slitting tool as claimed in claim 2, wherein the first and second blades are mounted extending from a second groove said second groove having an apex which, when the elongated members are closed, confronts the first groove apex and whose distance from the longitudinal axis steadily increases proceeding away from the second groove apex in either direction along the longitudinal axis.

* * * * *

UNITED STATES PATENT AND TRADEMARK OFFICE
CERTIFICATE OF CORRECTION

PATENT NO. : 5,093,992

DATED : March 10, 1992

INVENTOR(S) : Kenneth D. Temple, Jr., et al

It is certified that error appears in the above-identified patent and that said Letters Patent is hereby corrected as shown below:

On the title page, item (73) should read

-- Assignee: Siecor Corporation, Hickory, N. C. --

Signed and Sealed this

Fourth Day of May, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,093,992

DATED : March 10, 1992

INVENTOR(S) : Kenneth D. Temple, Jr., et al.

It is certified that error appears in the above-identified patent and that said Letters Patent is hereby corrected as shown below:

Column 2, line 39, claim 1, insert a comma immediately preceding the word "said".

Column 2, line 40, claim 1, delete the word "is".

Column 2, line 54, claim 3, insert a comma immediately preceding the word "said".

Column 2, line 62, claim 4, insert a comma immediately preceding the word "said".

Signed and Sealed this

Fifth Day of October, 1993

*Attest:*

BRUCE LEHMAN

*Attesting Officer*   *Commissioner of Patents and Trademarks*